United States Patent Office 3,090,751
Patented May 21, 1963

3,090,751
LUBRICATING AND SEALING COMPOSITIONS
George F. Scherer, Oakland, and Otto T. Bierwagen, Alameda, Calif., assignors to Rockwell Manufacturing Company, Pittsburgh, Pa., a corporation of Pennsylvania
No Drawing. Filed Dec. 28, 1956, Ser. No. 631,019
12 Claims. (Cl. 252—21)

This invention relates to lubricating and sealing compositions and methods for making the same.

The compositions are particularly useful as a lubricant and sealant in valves such as the type described in the patent to Nordstrom, 2,398,444, issued April 16, 1946, especially when such valves are used in high pressure natural gas transmission lines which are subjected to extremely variable temperature conditions ranging from extreme sub-zero temperatures of −100° F. and lower, to +150° F. and higher. The temperature conditions may be those imposed by natural atmospheric conditions such as those encountered in frigid climates of the polar or semi-polar regions, or they may be imposed in laboratory or manufacturing processes.

Lubricating and sealing compositions for plug valves are well known in the art. They may be either molded plastic bodies such as extrudable sticks, or highly viscous liquids possessing sufficient consistency to effect efficient sealing of the valve against existing line pressure. It is essential that the compositions have sufficient metal adhesion and load bearing capacity to provide effective lubrication for moving parts of the valve so that they may function with reasonable ease and without damage under existing conditions of temperature and pressure.

The force required to operate a valve generally increases as the consistency of the valve lubricant increases and it is usual that the consistency of the lubricant increases as the temperature decreases. Lubricants exist which have a consistency sufficiently low to permit operation at temperatures of −50° F. and lower, but these known lubricants lose their consistency and metal adhesion at temperatures above +100° F. to such an extent that they no longer function as effective lubricants and sealants at the higher temperatures. This is especially true when the line fluid is under considerable pressure, for example, 500 to 1500 p.s.i.g.

Further, it has been found that a lubricating and sealing composition which will function effectively in a valve of one size will lose its lubricating and sealing properties in a valve of a larger size. For example, a lubricating and sealing composition which functions effectively under extreme conditions in a plug valve of 4″ nominal diameter will lose its effectiveness under the same conditions in a valve of for example 12″ nominal diameter. Furthermore, lubricants presently known in the art which will function at temperatures of −50° F. or lower have had insufficient consistency at temperatures up to +110° F. to permit molding into plastic bodies or sticks which will retain their form at normal room temperatures.

An object of this invention is to provide a moldable lubricant and sealant composition comprising as its essential ingredients a major portion of extremely low pour point oil, and lesser portions of a bentonite-amine reaction product, and a polyalkene, and more particularly polybutene, the composition retaining its effective lubricating and sealing properties at extremely variable temperatures.

Another object of this invention is to provide a highly viscous lubricant and sealant composition comprising a major portion of a hydrocarbon oil and lesser portions of a bentonite-amine reaction product, a polybutene, and a low molecular weight highly polar compound.

A further object of this invention is to provide a moldable lubricating and sealing composition which will retain its consistency at temperatures varying from extremely low to high.

Another object of this invention is to provide a moldable lubricating and sealing composition which will retain its lubricating and sealing properties in valves of varying size while operating in extremely variable temperatures.

Still another object of this invention is to provide a method of making a lubricating and sealing composition comprising as its essential ingredients an extremely low pour point lubricating mineral oil, a bentonite-amine reaction product and a polybutene.

Other objects of the invention will, in part, be obvious, and will, in part, appear hereinafter.

For a thorough understanding of the nature and objects of the invention, reference should be had to the following detailed description.

To make a moldable lubricant and sealant composition of this invention, from 45 to 80 parts by weight of an extremely low pour point lubricating mineral oil is admixed with from 8 to 17 parts by weight of a bentonite-amine reaction product. To this mixture there is admixed from 6 to 17 parts by weight of a polybutene and if desired, not more than 10 parts by weight of an extreme pressure additive to be hereinafter described.

In preparing the above formulation, an extremely low pour point mineral oil which may be slightly thickened with acrylic polymers is placed in a suitable vessel equipped with an agitator and a source of heat. The amount of oil initially placed in the vessel is about ⅓ to ½ the total charge of oil. A bentonite-amine reaction product and oil slurry is then prepared by adding small portions of a bentonite-amine reaction product to the oil and agitating between additions. After the total charge of bentonite-amine reaction product has been added, agitation is continued until a fairly homogeneous mass is obtained. A sufficient amount of a low molecular weight polar organic compound is then added as a dispersion aid to cause the mixture to form a heavy jell. Usually, 1.5% to 3% by weight of the total charge of lubricant is sufficient to cause the mixture to jell but the amount of polar compound may be varied to suit the particular system. The remainder of the oil is added in small portions to this mixture and worked in by continued agitation. After all of the oil is added, the mixture is heated in order to drive off the low molecular weight polar organic compound. During this heating period, the required amount of polybutene and the extreme pressure additive which is optional, is worked into the mixture. Heating is continued until a temperature of from 250° F. to 300° F. is reached. The mixture is then cooled to below 150° F. and water amounting to 0.1% to 0.25% by weight of the total charge is added in order to stabilize the jell. If desired, about 4 to 6 parts by weight of finely divided mica may be added at this point. Mica is used to inhibit galling when the lubricant is subjected to high temperatures to the point where the lubricant matrix is greatly reduced in consistency. The lubricating and sealing composition is allowed to cool to room temperature and finished by processing through a colloid or paint mill, homogenizer or other dispersing equipment capable of exerting a high shearing stress. A colloid mill with a setting of 0.001″ to 0.003″ between rotor and stator has been found to give good homogenizing results. This composition may then be molded into plastic bodies or sticks of desired size and shape suitable for use in plug valves or other devices requiring a similar lubricant.

The low pour point lubricating mineral oils utilized in this invention are those well known in the art, such as those mineral oil compositions commonly marketed as aircraft hydraulic cylinder oils or aircraft hydraulic cylinder fluids. Low viscosity oils having API gravities ranging from 30.0° and having pour points of −50° F. or lower comprising essentially light gas oils thickened with acrylic polymers have given particularly good results. Of course it is usual for oils with low pour points to contain pour point depressants.

The bentonite-amine base reaction products employed in this invention are composed of a montmorillonite mineral in which at least a part of the cation content of the mineral has been replaced by a cation of an organic base. Clays that contain as a primary constituent a mineral of that group known as montmorillonites are generally referred to as bentonites. Bentonites in their raw state are hydrophilic but upon reacting with organic bases of their salts become organophilic products.

More specifically, a bentonite clay of the character described and exhibiting substantial base-exchange capacity is reacted with an organic compound, more particularly one generally known as an onium compound, by substituting for the clay cation the cation of the organic compound. The reaction product may be prepared not only from a base-salt reacted with a clay-salt, but from a free base reacted with an acid clay.

Examples of organic base compounds and their salts usable in the practice of the invention are salts of aliphatic, cyclic, aromatic, and heterocyclic amines; primary, secondary, and tertiary amines and polyamines; also quaternary ammonium compounds, as well as other monovalent or polyvalent onium compounds.

In practicing this invention, aliphatic amine salts having from 12 to 20 carbon atoms, for example, hexadecyl amine salts and octadecyl amine salts, yield excellent results. The ratio of amine compound to bentonite may be varied within certain limits in converting the bentonite to the organophilic condition. In general, however, it is desired to react the amine salt with the bentonite in the approximate ratio of 100 milliequivalents of amine salt to 100 grams of bentonite. Reaction products produced within this ratio give the maximum swelling as tested in nitrobenzene.

It is to be understood that when reference is made to basic organic onium compounds such as amines, it is implied that before reacting with the clay by base-exchange the amine is connected to the onium formed either by the addition of acid or by reason of the fact that some part of the inorganic base in the naturally occuring clay consists of hydrogen.

An example of the preparation of a suitable bentonite-amine reaction product is as follows:

One thousand grams of a Wyoming bentonite is dispersed in 25.45 liters of water, and the slurry formed is allowed to stand for two hours to settle out the non-clay impurities. In a separate vessel, 54.37 grams of glacial acetic acid is added to 240 grams of octadecyl amine, and the amine salt is then dissolved in 1.45 liters of warm water. Upon addition of the amine salt solution to the dispersed bentonite, flocculation occurs and the precipitate, after being filtered, washed, dried and pulverized, constitutes the bentonite-organic base reaction product.

Other examples of suitable onium compounds and processes indicating how a bentonite-organic base reaction product may be prepared are found in the patent to Jordan 2,531,440, issued November 28, 1950, and the patent to Hauser 2,531,427, issued November 28, 1950. One or more of the bentonite-amine reaction products may be admixed with the oil used.

The polybutene used in this invention may be polymers of either butylene or isobutylene or both. Excellent results have been obtained with butylene polymers having an average molecular weight of from 400 to 12,000.

The low molecular weight polar additives used as a dispersion aid in this invention are well known in the art. Examples of such dispersion aids are low molecular weight alcohols, ketones or ether alcohols, such a methanol, acetone, methyl ethel ketone, diacetone alcohol, etc.

When the lubricating and sealing composition of this invention is used upon surfaces of devices operating under extreme loads, it is advantageous to add extreme pressure additives of the type familiar to those skilled in the art. These extreme pressure additives are, in general, hydrocarbons containing chlorine, sulphur, or phosphorus. Examples of such extreme pressure additives are chlorinated biphenyl and chloronapthyl xanthate.

A suitable chlorinated biphenyl which is readily available commercially is the solid crystalline reaction product of chlorine and biphenyl containing approximately 65%–70% by weight chlorine and having a distillation range of from 435° F. to 450° F.

The invention is illustrated in the following examples in which the parts are parts by weight of the total composition.

*Example I*

| | Parts |
|---|---|
| Aircraft hydraulic cylinder oil (API gravity 30.3°) | 67 |
| Bentonite-amine reaction product (dimethyl dihexadecyl ammonium bentonite) | 16 |
| Polybutene (ave. mol. wt. 1500) | 17 |

The ingredients of the above formulation were processed as described supra. The resulting lubricant and sealant was found to effectively seal a 24″ plug valve of the type manufactured by the Rockwell Manufacturing Company, Oakland, California, and chosen at random from their stock. The valve was chilled at −50° F. for 24 hours prior to pressurizing with nitrogen at 800 p.s.i.g. Operating torques were measured and found to be well within the design limits of the valve and its attached gearing. Comparable results were obtained in tests at temperatures ranging from −50° F. to +130° F.

*Example II*

| | Parts |
|---|---|
| Aircraft hydraulic cylinder oil (API gravity 33.0°) | 63 |
| Bentonite-amine reaction product (dimethyl dihexadecyl ammonium bentonite) | 16 |
| Polybutene (ave. mol. wt. 1500) | 16 |
| Chlorinated biphenyl (boiling range 385° C. to 450° C.) | 5 |

The ingredients of the above formulation were prepared as described supra. The resulting lubricating and sealing composition was tested in a 4″ plug valve of the type manufactured by Rockwell Manufacturing Company, Oakland, California, and chosen at random from their stock. Tests showed that the valve was operable at temperatures as low as −98° F. without exerting an unduly high effort. This formulation further provided for efficient sealing and reasonable operating effort at temperatures up to +150° F.

When a lubricant and sealant is required for valves subjected to temperature conditions which do not extend to lows in the order of −98° F. but go to highs in the order of +210° F., the load bearing capacity and metal adhesion of the novel compositions of this invention may be improved by the addition of up to 10 parts by weight of a highly polar compound. Such compounds include fatty acids, glycols, polyhydric alcohols, and especially glycerol. Water may also be used.

In practice, the polar compound may be added to the composition either prior to or after comminution in the paint or colloid mill. A stable emulsion of these materials with the basic formulation is produced by agitation for a period of about one hour. The bentonite amine reaction product used as a thickener also acts as an emulsifier for the "water-in-oil" type emulsion which forms.

The use of polar organic materials such as oleic acid and stearic acid in lubricants are well known in the art and their use has been extensively described. It is generally believed that the fatty acids added to mineral oils become adsorbed at the metal-oil interface, thereby increasing the wetting of the metal by the mineral oil base. In the prior art, however, polar materials such as oleic acid and stearic acid have been added only in low concentrations and are soluble in the mineral oil base. In the practice of this invention, much higher concentrations are used with the polar compounds being emulsified with the mineral oil, thereby considerably altering the physical properties of the resulting lubricant and sealant composition.

The addition of more than 3% by weight of a polar compound generally results in a reduction of effectiveness at the lower temperatures for the lubricating composition, but on the other hand, increases its high temperature effectiveness. Thus, for example, a lubricant prepared essentially as described in Example II, has a useful temperature range from about −98° F. to about +150° F., while a similar lubricant in which a polar compound in an amount of about 10 parts by weight has been added, has a useful temperature range from about −60° F. to +210° F.

The following example illustrates the novel use of polar additives:

*Example III*

| | Parts |
|---|---|
| Aircraft hydraulic cylinder oil | 49 |
| Bentonite amine reaction product (dimethyl dihexadecylammonium bentonite) | 16 |
| Polybutene (ave. mol. wt. 1500) | 16 |
| Chloronated biphenyl (boiling range 385° C. to 450° C.) | 5.0 |
| Mica | 5.0 |
| Glycerol | 9.0 |

The ingredients of the above formulation were prepared as described hereinbefore, with the exception that the glycerol was added together with the first addition of oil and emulsified with the oil during the preparation of the bentonite oil gel. The resulting highly viscous liquid lubricating and sealing composition was tested in a 4" plug valve of the type manufactured by Rockwell Manufacturing Company, Oakland, California, and chosen at random from their stock. Tests showed that the valve was operable without exerting an unduly high effort while being subjected to an unbalanced gas pressure of 1000 p.s.i., and in temperature conditions ranging from −60° F. to +210° F. The lubricant also provided excellent sealing throughout the entire temperature range. In similar tests, the lubricant prepared according to Example II did not seal as well as this example at temperatures above +150° F.

As a further example of the novel use of polar additives, it has been discovered that a polar compound thickened to a plastic consistency by carboxymethylcellulose and soap enhances metal adhesion and load bearing capacity of the novel lubricants and sealants of this invention. Glycerol has given particularly good results in this combination.

Example IV illustrates a polar compound thickened to plastic consistency which may be combined in a formulation of this invention.

*Example IV*

| | Parts by weight |
|---|---|
| Glycerol | 42.0 |
| Carboxymethylcellulose | 2.0 |
| Green soap | 36.0 |
| Sodium silicate | 2.1 |
| Mica | 4.2 |
| Granulated soap | 13.7 |

From the above ingredients, a thickened polar compound was prepared by pouring ⅔ of the glycerol into a suitable container equipped with an agitator. The carboxymethylcellulose was added slowly with continued agitation until the mixture was uniform. The silicate of soda was then added and mixed until uniform. The balance of the glycerol was added and the mixture agitated for 10 minutes. Agitation was then stopped and the green soap added. The mixture was agitated for another 10 minutes. The granulated soap (soda soap) was then added and agitation continued for still another 10 minutes. The mixture was then heated with agitation until a temperature of 300° F. was reached. Agitation was continued for 20 minutes at this temperature. The mica was then added and this mixture was agitated for 10 minutes and then discharged and allowed to cool.

Green soap and granulated soap are of course well known in the art and are readily available commercially. Green soap is the product of the saponification of linseed oil with potassium hydroxide and granulated soap is the product of the saponification of lards and tallows with sodium hydroxide.

*Example V*

A lubricant and sealant was prepared by admixing 9 parts of the composition prepared in Example II and 1 part of the composition of Example IV and agitating for one hour. This lubricant was found to have superior metal adhesion and load bearing capacity compared to the lubricant of Example II alone. Its superior lubricating properties were demonstrated by a test in which ten 24" x 30" plug valves of the type manufactured by Rockwell Manufacturing Company, Oakland, California, were assembled in accordance with routine shop practice. These valves were lubricated with a lubricant prepared according to Example II. They were tested under about 1000 p.s.i.g. unbalanced line pressure, and temperatures from −50° F. up to about +75° F., the operating torques averaging about 120 ft. lbs. Following this test they were relubricated with a mixture of 9 parts lubricant of Example II and 1 part of the composition of Example IV. Operating torques under the same test conditions were reduced by about 20% or more in all the valves.

This improvement in operating torques cannot be attributed to higher consistency because the lubricant of Example II has a consistency of approximately 35 arbitrary units, whereas the lubricant comprising the above mixture of Examples II and IV has a consistency of approximately 20 units on the same scale.

While this invention is particularly suitable as a lubricant and sealant for plug type valves of the type described, especially when such valves are used in high pressure natural gas transmission lines which are subjected to extreme variations in temperature it will be understood that this invention is not to be limited to this particular device, as this invention may be applied to lubricating any bearing part or other allied uses. Accordingly, it is to be intended that all material contained in the above description shall be interpreted as illustrative and not in a limiting sense. The scope of the invention is indicated by the appended claims rather than by the foregoing description, and all changes which come within the meaning and range of equivalency of the claims are therefore intended to be embraced therein.

What is claimed and desired to be secured by United States Letters Patent is:

1. A lubricating and sealing composition consisting essentially of 45 to 80 parts by weight of an extremely low pour point lubricating mineral oil; 6 to 17 parts by weight of a polybutene having an average molecular weight from about 400 to about 12,000; and a bentonite-amine reaction product in sufficient quantity to render said composition of sufficient viscosity to perform an adequate sealing and lubricating function for use in lubricant-sealed valves over a temperature range of from −50° F. to +130° F.

2. A lubricating and sealing composition as defined in claim 1 in which there is present not more than 10 parts by weight of an extreme pressure additive.

3. A lubricating and sealing composition as defined in claim 1 in which there is present not more than 10 parts by weight of chlorinated biphenyl.

4. A lubricating and sealing composition of matter consisting essentially of 45–80 parts by weight of an extremely low pour point lubricating mineral oil; 6–17 parts by weight of a polybutene having an average molecular weight from about 400 to about 12,000; and a bentonite-amine reaction product in sufficient quantity to render said composition of sufficient viscosity to perform an adequate sealing and lubricating function for use in a lubricant-sealed valve over a temperature range of from −98° to +150° F.

5. A lubricating and sealing composition as defined in claim 1, wherein said bentonite-amine reaction product is present in a quantity of from 8 to 17 parts by weight.

6. A lubricating and sealing composition consisting essentially of from 45 to 80 parts by weight of a hydrocarbon oil, from 8 to 17 parts by weight of a bentonite-amine reaction product, from 6 to 17 parts by weight of a polybutene and from 3 to 10 parts by weight of a highly polar compound.

7. A lubricating and sealing composition as defined in claim 6 in which the polar compound is glycerol.

8. A lubricating and sealing composition as defined in claim 6 in which there is present not more than 10 parts by weight of an extreme-pressure additive.

9. A lubricating and sealing composition consisting essentially of a major portion of an extremely low pour point mineral oil; a bentonite-amine reaction product in sufficient quantity to render said composition of suitable viscosity to perform an adequate sealing and lubricating function for use in lubricant-sealed plug valves over a temperature range of from −50° F. to +130° F.; and a polybutene having an average molecular weight between 400 and 12,000 in an amount approximately equal to that of the bentonite-amine reaction product.

10. A lubricating and sealing composition of matter consisting essentially of a major portion of an extremely low pour point mineral oil; a bentonite-amine reaction product in sufficient quantity to render said composition of suitable viscosity to perform an adequate sealing and lubricating function for use in lubricant-sealed plug valves over a temperature range of from −98° to +150° F.; and a polybutene having an average molecular weight between 400 and 12,000 in an amount approximately equal to that of the bentonite-amine reaction product.

11. A lubricating and sealing composition consisting essentially of a major portion of a composition comprising from 45 to 80 parts by weight of an extremely low pour point lubricating mineral oil, from 8 to 17 parts by weight of a bentonite-amine reaction product, from 6 to 17 parts by weight of a polybutene having an average molecular weight of from 400 to 12,000, and not more than 10 parts by weight of an extreme-pressure additive, and a minor portion of a composition having substantially the following formulation:

| | Parts by weight |
|---|---|
| Glycerol | 42 |
| Carboxymethylcellulose | 2 |
| Green soap | 36 |
| Sodium silicate | 2 |
| Mica | 4 |
| Granulated soap | 14 |

12. The lubricating and sealing composition of claim 11 in which the major portion is substantially 9 parts by weight and the minor portion is substantially 1 part by weight.

References Cited in the file of this patent
UNITED STATES PATENTS

| | | |
|---|---|---|
| 2,330,502 | Longman et al. | Sept. 28, 1943 |
| 2,412,929 | Bogart et al. | Dec. 17, 1946 |
| 2,490,949 | Delorenzo | Dec. 13, 1949 |
| 2,581,407 | Hain | Jan. 8, 1952 |
| 2,583,604 | Sirianni et al. | Jan. 29, 1952 |
| 2,626,241 | Sparks | Jan. 20, 1953 |
| 2,652,361 | Wood et al. | Sept. 15, 1953 |
| 2,658,869 | Stross et al. | Nov. 10, 1953 |
| 2,662,056 | McCarthy | Dec. 8, 1953 |
| 2,810,695 | Young | Oct. 22, 1957 |
| 2,847,380 | Zakin | Aug. 12, 1958 |

OTHER REFERENCES

"Carboxymethyl Cellulose," by Walsh et al., Ind. & Eng. Chem. (Oct. 1945), vol. 37, No. 10, pages 943–945.

"The Manufacture and Application of Lubricating Greases," Boner, Reinhold Pub. Corp., New York, 1954, pages 117, 118, 724–729, 733, 739 and 740.

UNITED STATES PATENT OFFICE
CERTIFICATE OF CORRECTION

Patent No. 3,090,751                                May 21, 1963

George F. Scherer et al.

It is hereby certified that error appears in the above numbered patent requiring correction and that the said Letters Patent should read as corrected below.

Column 2, line 63, for "exterting" read -- exerting --; column 7, line 20, after "polybutene" insert -- having an average molecular weight between 400 and 12,000 --.

Signed and sealed this 11th day of February 1964.

(SEAL)
Attest:

ERNEST W. SWIDER
Attesting Officer

EDWIN L. REYNOLDS
Acting Commissioner of Patents